June 27, 1967     H. R. BILLETER ET AL     3,327,992

CONTROL VALVES

Filed Jan. 6, 1965

INVENTORS
HENRY R. BILLETER
BY AXEL B. NELSON

PARKER & CARTER
ATTORNEYS

United States Patent Office 3,327,992
Patented June 27, 1967

3,327,992
CONTROL VALVES
Henry R. Billeter, Deerfield, and Axel B. Nelson, Mount
Prospect, Ill., assignors to Sloan Valve Company, Chicago, Ill., a corporation of Illinois
Filed Jan. 6, 1965, Ser. No. 423,652
3 Claims. (Cl. 251—267)

This invention relates in general to valves but more particularly to valves for throttling fluid flow or shutting it off, and the principal object of the invention is to design a new and improved valve of the foregoing type.

Another object is to provide a control valve or stop having means for quieting the flow of fluid therethrough, and in which certain of the operating parts are made of molded corrosion-proof materials.

A further object is to provide a new and improved control valve which is economical to manufacture, has relatively few parts, is readily assembled, and operates in a reliable manner for long periods without attention.

Another object is to provide a control valve in which the operating stem is of the non-rising type so that the valve closing member is moved from the valve seat without rotation.

A further object is to design an improved control stop in which leakage outward from the valve body through the bonnet and operating stem is effectively prevented by locating an O-ring between the valve plug and the guiding sleeve.

The invention consists in certain novel features of construction, operation and combination of the various parts and elements as will be more fully described and pointed out hereinafter in connection with the following detailed description which together with the accompanying drawings constitutes a preferred embodiment of the invention.

In the drawings:

FIGURE 6 is a cross-sectional side view of the valve plug, taken along the line 6—6 of FIGURE 5; while

Figure 1:
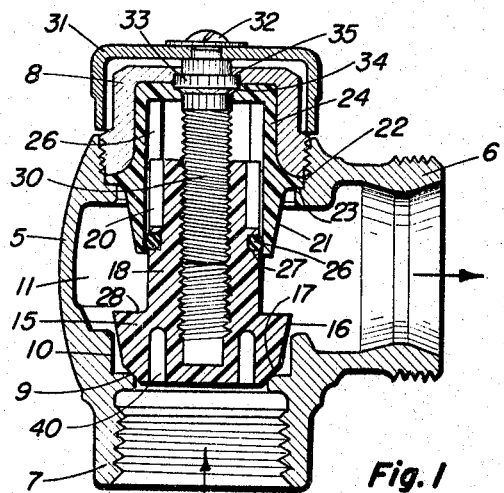
FIGURE 1 is a cross-sectional elevation of the control valve of the invention shown in the valve closed position.

Referring to the drawings, the control valve body or casing 5 is preferably a metal casting made of brass having an external threaded outlet connection 6, and an internal threaded inlet connection 7, together with a top opening closed by the bonnet 8. A valve seat 9 is formed at the inlet side of the valve which seat is surrounded by a counterbore 10. The hollow chamber 11 in the body forms the passage for fluid flow from the inlet 7 to the outlet 6. A valve plug 15 is arranged axially in chamber 11 in operative relationship to the valve seat 9 and in position to shut off the fluid flow or to throttle the same. The valve plug 15 has tapered sides 16 which in the valve closed position do not contact the walls of the counterbore 10, and a valve seating surface 17 on the bottom end of the plug for contacting the valve seat 9.

Figure 5:
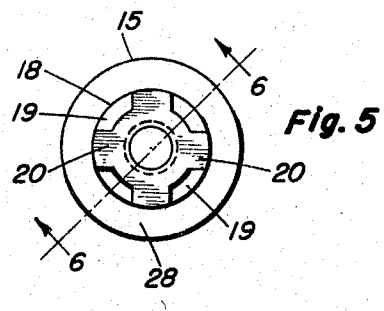
FIGURE 5 is a top view of the valve plug.
Figure 6:
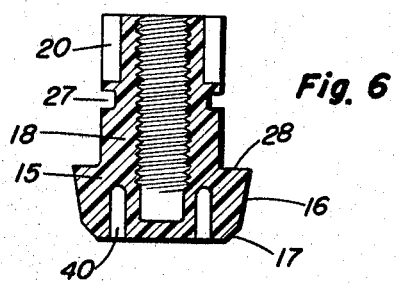

The valve plug 15 has an upwardly extended shank portion 18 formed integral therewith which at its upper end has a series of circumferential slots 19 and lugs 20 formed integral therein. The lugs 20 are equally spaced around the shank 18 as best shown in FIGURE 5 and are preferably four in number. The shank portion 18 of valve plug 15 is arranged to slide vertically within a cup-shaped guide sleeve 21 without turning the valve plug 15. A flange 22 formed around the outside diameter of the guide sleeve 21 is clamped against ledge 23 formed around the top opening in the valve body. The bonnet 8 is threaded into the valve body opening on top of the flange 22 so that the flange serves as a gasket to provide a leakproof seal precluding leakage outward through the body. The upper portion 24 of the guide sleeve 21 fits snug inside the bonnet 8 when the bonnet 8 is threaded tightly into the body.

Figure 4:
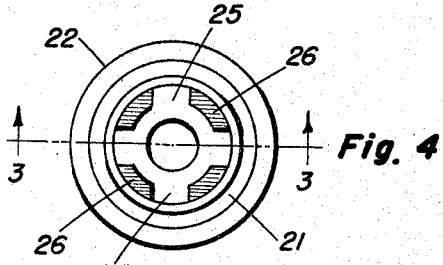
FIGURE 4 is a bottom view of the guide sleeve.

The internal diameter of guide sleeve portion 24 is provided with integral slots 25 and lugs 26 arranged in spaced relationship as best seen in FIGURE 4. These slots 25 and lugs 26 interfit in slidable relationship with the slots 19 and lugs 20 on the top end of valve plug 15 to provide a spline action between them. In order to provide a seal against leakage from the chamber 11 into the slots and lugs of the valve plug 18 and guide sleeve 21, an O-ring 29 is recessed in a groove 27 formed around the shank 18 immediately below the slots 19 and lugs 20. In the position shown in FIGURE 2, the lower end of guide sleeve 21 abuts the rear end 28 of the valve plug 15 to serve as a stop for the upper limit of movement of the valve plug 15.

An operating stem 30 for the valve extends axially through the valve plug 15 and its shank portion 18, and in threaded engagement for almost the full length of the valve plug. At the upper end operating stem 30 is provided with a manual operating knob or wheel handle 31 which is fastened to the end of operating stem 30 by a screw 32. The upper end of operating stem 30 also has a collar 33 formed around it which is adapted to serve as a bearing within a recess 34 formed in the top of guide sleeve 24 and a second recess 35 formed in the bottom of the bonnet 8. The collar 33 is clamped between the bonnet 8 and guide sleeve 24 and thereby prevented from vertical movement while permitted to rotate in the recesses 34 and 35 as a bearing.

In the shut-off position of the valve as seen in FIGURE 1, the valve plug 15 makes a tight fit with its surface 17 upon the valve seat 9 and against the fluid pressure from the inlet 7. In this position the wheel handle 31 has been turned so that the operating stem 30 is threaded the maximum distance out of valve plug 15. Because of the collar 33 the valve stem 30 does not rise and the wheel handle 31 remains in the same position on the end of the bonnet 8 with respect to the valve body. Because the slots and lugs permit vertical movement of the valve plug 15 while preventing rotary movement, the wear upon the valve seating portion 17 and valve seat 9 is greatly reduced and there is less chance that either of these seating surfaces will be grooved or have abrasive substances ground into them as would occur with a turning movement of the valve plug.

Figure 2:
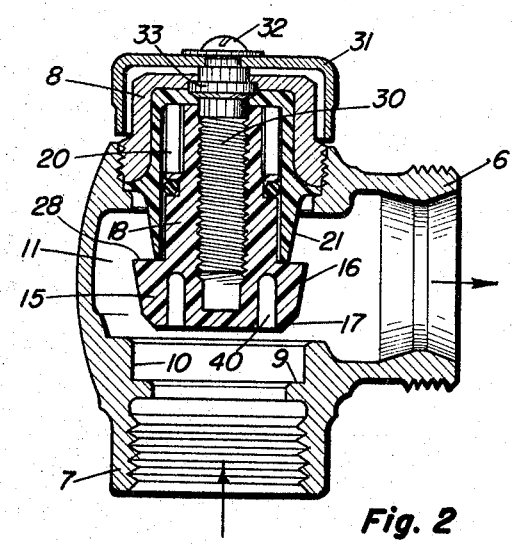
FIGURE 2 is a similar view with the valve shown in open position.
Figure 3:
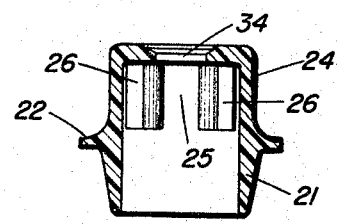
FIGURE 3 is a cross-sectional side view of the guide sleeve taken along the line 3—3 of FIGURE 4.

When the wheel handle 31 is turned to open the valve to water flow or to throttle the flow, as shown in FIGURE 2, the operating stem 30 only is rotated, and threads into the valve plug 15 as far as desired. The slots and lugs slidably engage one another in a spline action, the slots 19 and lugs 20 meshing and sliding up into the lugs 26 and slots 25 respectively, thereby moving the valve plug 15 the desired distance away from the valve seat 9.

The arrangement of the valve plug 15 with respect to its seat 9 is such that on higher line pressures the water flow is relatively quiet in operation, the velocity flow being reduced so as to preclude the formation of cavitation noises, squeals and closing noises, as the valve plug approaches the valve seat. In the valve adjustment where the plug 15 is moved a short distance from its seat 9, the inlet water flow first strikes the valve surface 17 and is deflected within the counterbore 10 creating turbulence and reducing the velocity a certain amount. The water flow then passes out of the counterbore 10 upwardly and along the outwardly tapered sides 16 of the valve plug 15. Due to the particular shape and formation of the chamber 11 in the valve body the inlet jet stream is deflected and forced to turn back upon itself in the chamber, thereby further reducing its velocity and quieting the flow. To assist in further providing a quieting action to water flow through the valve, an annular groove 40 is formed in the bottom end of the valve plug 15. This has a tendency to cause a certain amount of turbulence thereby reducing the velocity flow.

It is highly desirable that the parts of the valve exposed to water flow be made of materials not subject to corrosion, pitting and possible electrolytic action caused by impurities in the water. To this end the valve plug 15 and associated integral parts are preferably molded of a plastic material such as Du Pont nylon which material exhibits the desired qualities. This material also can be economically purchased and molded in one piece without further machining, and is strong enough to withstand high pressures. The groove 40 in the valve plug 15 also eliminates molding stresses in the part as well as reduces the amount of material required. The guide sleeve 21 is of the same material and is also molded in one piece. All of the parts are easily assembled or replaced when necessary, thereby further economizing on the cost of the valve. Outward leakage from the valve is prevented at the vital points where the bonnet 8 is screwed into the valve body by the flange 22, which serves well as a gasket by being clamped in position. The O-ring 29 keeps leakage from entering the space below the top 24 of the guide sleeve 21 and outward through the collar 33 on the valve stem 30 as well as around the bonnet 8.

It is to be noted that the bonnet 8 is threaded into the top opening of the valve body 5 but is completely isolated from contact with any water flow through the chamber 11 of the device. The guiding sleeve 21 serves as a barrier means and since it is molded of plastic material no possible electrolytic action can occur from corrosive waters such as sea water, and between the bonnet and body. The threaded connection between the body and bonnet is completely protected by the plastic flange 22. The corrosive action upon the bonnet 8, usually occurring under adverse water conditions, is thereby entirely eliminated, because no parts of the bonnet at any time are in contact with such waters.

Figure 7:
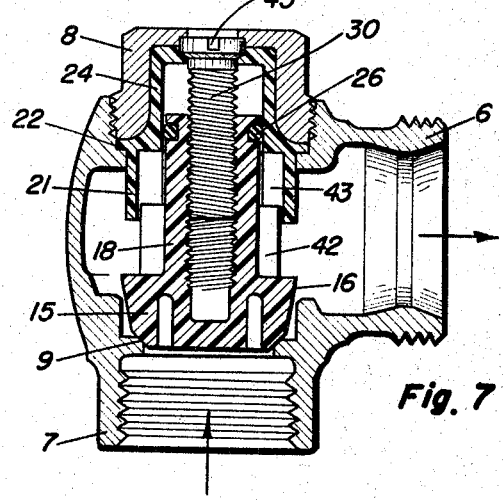
FIGURE 7 is a cross-sectional side view of a modified form of the control valve.

Referring to the modification shown in FIGURE 7, the structure is generally similar to that of FIGURE 1, except that the lugs 42 are formed on the bottom end of the shank 18 of the valve plug 15, and slots 43 are formed on the bottom end of the guide sleeve 21. The O-ring 29 is arranged on the top end of the shank 18. The operation of the parts are the same as described except that the lugs 42 and slots 43 are exposed to the water flow. The operating stem 30 is in this case provided with a screw driver slot 45 instead of a wheel handle to prevent unauthorized manual adjustment of the valve.

It is to be understood that the various details of structure and arrangement of the parts may be changed or modified without departing from the spirit of the invention, or exceeding the scope of the appended claims.

What is claimed is:

1. In a valve, a body having an inlet, and outlet, and a valve seat therebetween, a movable valve plug in said body arranged to open and close upon said valve seat to control fluid flow from said inlet to said outlet, and extending shank portion formed on said valve plug, a hollow guide sleeve in said body into which said shank portion is adapted to reciprocate, interfitting lugs and slots on said shank portion and said guide sleeve, the lugs and slots in said guide sleeve extending downward for at least half the length of the interior of said guide sleeve, and the lugs and slots around said shank portion extending upward for at least half the length of said shank portion, a cup-shaped bonnet on said valve body, a flange formed around said guide sleeve at a point intermediate the length of said guide sleeve, said guide sleeve flange being clamped by said bonnet to said valve body to support the guide sleeve and form a seal to prevent leakage outward from said body, the portion of said guide sleeve extending above said flange being nested within said cup-shaped bonnet, and the lower portion projecting into the valve body, an operating stem threaded into said valve plug and its associated shank portion, said operating stem extending through said guide sleeve and said bonnett, cooperating means on said operating stem, said bonnet and said guide sleeve for preventing said operating stem from moving longitudinally while being rotated, whereby said valve plug is moved into and out of operative relation to said valve seat, said interfitting lugs and slots being in slidable relationship with one another to prevent rotary movement of said valve plug while said operating stem is being threaded in said valve plug, said shank portion being completely recessed in said guide sleeve in the wide open position of said valve plug and said lugs and slots being completely interengaged for their full length, and an O-ring seal on said shank portion intermediate the ends thereof and below said lugs and slots, said O-ring being in sealing engagement with the walls of said guide sleeve in all positions of said valve plug.

2. In a valve comprising a body having an inlet, an outlet, and a valve seat therebetween, a valve plug in said body arranged to open and close upon said valve seat, said valve plug having an upwardly extending shank portion provided with a series of slots and lugs around the circumference thereof, a guide sleeve in said body receiving said shank portion and provided with a series of slots and lugs around the interior thereof, the slots and lugs of said valve plug and said guide sleeve slidably engaging one another in a spline action arrangement, the lugs and slots in said guide sleeve extending downward for at least half the length of the interior of said guide sleeve, and the lugs and slots around said shank portion extending upward for at least half the length of said shank portion, said guide sleeve being cup-shaped and having a sealing flange around the outside thereof at a point intermediate the length of said guide sleeve for supporting said guide sleeve on said valve body, a bonnet threaded on said valve body and clamping said flange in position, said bonnet being cup-shaped and receiving the upper portion of said cup-shaped guide sleeve in nested fashion, the lower portion of said guide sleeve projecting into said valve body, said shank portion being completely recessed in said guide sleeve in the wide open position of said valve plug and said lugs and slots being completely interengaged for their full length, an O-ring seal on said shank portion intermediate the ends thereof and below said lugs and slots, said O-ring being in sealing engagement with the walls of said guide sleeve in all positions of said valve plug, said guide sleeve and said bonnet having recesses formed in adjacent meeting surfaces and axially of said valve body, an operating stem extending axially of said valve body and through said guide sleeve and said bonnet, said operating stem being threaded into said valve plug and its shank portion, and a collar formed on said operating stem arranged in said recesses and serving as a bearing for said operating stem, whereby said operating stem is adapted to adjust said valve plug within said guide sleeve without the operating stem moving axially in said valve body, and due to the action of said slots and lugs said valve plug is prevented from being rotated.

3. In a valve, a body having an inlet and outlet, and a valve seat therebetween, a movable valve plug in said body arranged to open and close upon said valve seat to control fluid flow from said inlet to said outlet, an extending shank portion formed on said valve plug, a hollow guide sleeve in said body into which said shank portion is adapted to reciprocate, interfitting lugs and slots on said shank portion and said guide sleeve, a cup-shaped bonnet on said valve body, a flange formed around said guide sleeve at a point intermediate the length of said guide sleeve, said guide sleeve flange being clamped by said bonnet to said valve body to support the guide sleeve and form a seal to prevent leakage outward from said body, the portion of said guide sleeve extending above said flange being nested within said cup-shaped bonnet, and the lower portion projecting into the valve body, an operating stem threaded into said valve plug and its associated shank portion, said operating stem extending through said guide sleeve and said bonnet, cooperating means on said operating stem, said bonnet and said guide sleeve for preventing said operating stem from moving longitudinally while being rotated, whereby said valve plug is moved into and out of operative relation to said valve seat, said interfitting lugs and slots being in slidable relationship with one another to prevent rotary movement of said valve plug while said operating stem is being threaded in said valve plug, said shank portion being completely received in said guide sleeve in the wide open position of said valve plug and said lugs and slots being completely interengaged for their full length, and sealing means carried by said shank portion and positioned to be in sealing engagement with the walls of said guide sleeve in all positions of said valve plug.

References Cited

UNITED STATES PATENTS

| | | | |
|---|---|---|---|
| 1,510,528 | 10/1924 | Sebenste | 251—266 |
| 2,334,686 | 11/1943 | Binnall | 251—118 |
| 2,341,411 | 2/1944 | Ojalvo | 251—266 X |
| 3,057,370 | 10/1962 | Hamilton | 251—368 X |

FOREIGN PATENTS 128,494 6/1919 Great Britain.

WILLIAM F. O'DEA, *Primary Examiner.*

D. R. MATTHEWS, *Assistant Examiner.*